350-96.1

XR 2,843,664 CROSS REFERENCE SEARCH ROOM

TX3085H

July 15, 1958 R. E. OLIN 2,843,664

TRANSPARENT SCANNING DRUM UTILIZING
A LIGHT CONDUCTING ROD

Filed Sept. 29, 1954 2 Sheets-Sheet 1

2530

*Inventor,*
ROBERT E. OLIN

2843664
NO OR CLASSIF

July 15, 1958 — R. E. OLIN — 2,843,664

TRANSPARENT SCANNING DRUM UTILIZING A LIGHT CONDUCTING ROD

Filed Sept. 29, 1954 — 2 Sheets-Sheet 2

Inventor,
ROBERT E. OLIN

United States Patent Office 2,843,664 Patented July 15, 1958

2,843,664

TRANSPARENT SCANNING DRUM UTILIZING A LIGHT CONDUCTING ROD

Robert E. Olin, Oradell, N. J., assignor to Fairchild Camera and Instrument Corporation, a corporation of Delaware Application September 29, 1954, Serial No. 459,192

4 Claims. (Cl. 178—7.1)

This invention relates to apparatus for scanning a transparent image sheet and, while it is of general application, it is particularly adapted for embodiment in a machine for producing screened relief pattern plates of the type described and claimed in Patent No. 2,575,546 to Boyajean and it will be specifically described in such an embodiment.

A photoelectric engraving machine of the type described in aforesaid Patent 2,575,546, in general, comprises two synchronously movable supporting members, such as rotatable cylinders, on one of which is mounted an image sheet, such as a photographic print, and on the other of which is mounted a plate to be engraved, such as a sheet of cellulose nitrate. The machine includes a device for developing a "screen-frequency" signal, that is, a signal of a frequency equal to that of the series of elemental deformations of the engraved plate in the course of scanning of an image and engraving a plate. The image sheet is scanned by a photoelectric pick-up system and the engraving plate is scanned synchronously therewith by an engraving head having a heated oscillating stylus. The photoelectric pick-up system develops an electrical signal varying in accordance with variations in the shade or tone value of the successive elemental areas of the image being scanned and this electrical signal is used to modulate the screen-frequency signal, such modulated signal being applied to an electromagnetic actuating device of the engraving head to form a series of deformations on the engraving plate, resulting in a half-tone engraving similar to that obtained by conventional photochemical processes.

In a machine of the type described, the image to be scanned is in the form of a positive photographic print, positive printed page, or the like, and the video signal is developed by focusing light from a suitable source to a scanning spot on the image sheet and picking up the reflected light at the spot by a photoelectric unit. In some cases, however, it is desired to engrave the plate directly from a photo-negative or transparency and the present invention comprises a modification of the image-sheet scanning apparatus described in aforesaid Patent 2,575,546 suitable for scanning transparent image sheets.

While apparatus has heretofore been proposed for scanning transparent image sheets, such apparatus has left much to be desired from the standpoint of uniform illumination of all parts of the image sheet during scanning and simplification of the mechanism. Such apparatus has usually embodied complex rotary electrical or mechanical connections, or both, and has usually included an elongated tubular light source within a rotary transparent cylinder in which replacement of the light source has required a substantial disassembly of the apparatus and in which the light source has generated a substantial amount of heat within the cylinder which is not readily dissipated. The distribution of light from such an elongated source is also generally quite non-uniform.

It is an object of the invention, therefore, to provide a new and improved apparatus for scanning a transparent image sheet which obviates one or more of the above-mentioned limitations of prior apparatus of such type.

It is another object of the invention to provide a new and improved apparatus for scanning a transparent image sheet in which the illumination of the entire image sheet during scanning is substantially uniform.

It is another object of the invention to provide a new and improved apparatus for scanning a transparent image sheet which is simple in construction involving no rotary electrical connections and a minimum of rotary mechanical connections.

It is still a further object of the invention to provide a new and improved apparatus for scanning a transparent image sheet in which the light source may be readily replaced on burn-out without substantial disassembly of the apparatus.

In accordance with the invention, there is provided in a machine for producing on a record sheet from a transparent image sheet a screened pattern suitable for image reproduction and including a rotatable cylinder for supporting a record sheet and a pair of synchronously reciprocable carriages individually including a recording element for scanning the record-sheet cylinder and an optical pick-up device, apparatus for scanning a transparent image sheet comprising a transparent image-sheet cylinder rotatable synchronously with the record sheet cylinder and disposed to be scanned by the optical pick-up device, an elongated tapered transparent rod extending into the transparent cylinder throughout its length and projecting from one end thereof. The transparent rod has one longitudinal face parallel and opposed to a longitudinal element of the cylinder and an opposite longitudinal face inclined toward the first face in a direction away from the end of the cylinder through which the rod projects. The scanning apparatus further includes means for illuminating the end of the rod projecting from the cylinder with substantially uniform intensity over the cross section thereof.

For a better understanding of the present invention, together with other and further objects thereof, reference is had to the following description taken in connection with the accompanying drawings, while its scope will be pointed out in the appended claims.

Referring now to the drawings.

Figures 2A, 3:
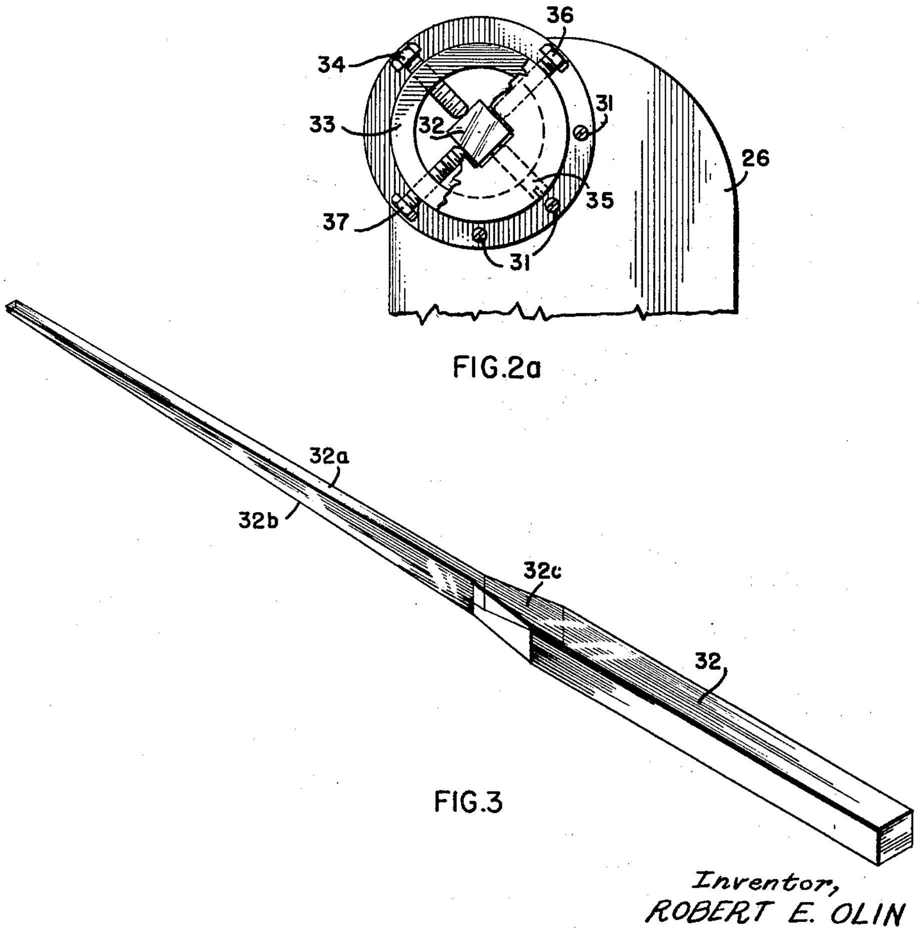
Fig. 2 is a longitudinal view, partly in section, of an image-sheet supporting and illuminating mechanism of the invention.
Figure 2:
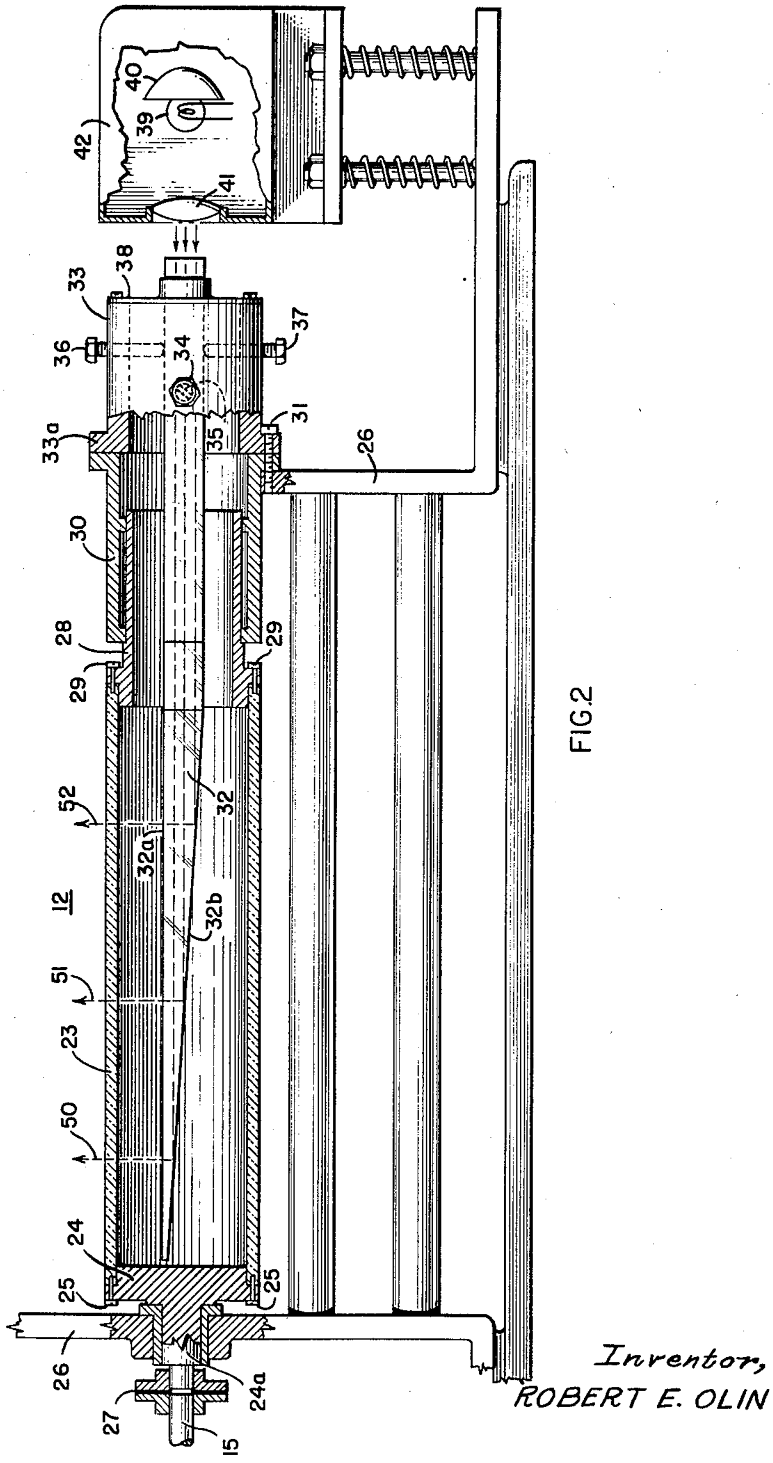

Fig. 2*a* is an end view of a detail of the apparatus of Fig. 2; while

Figure 1:
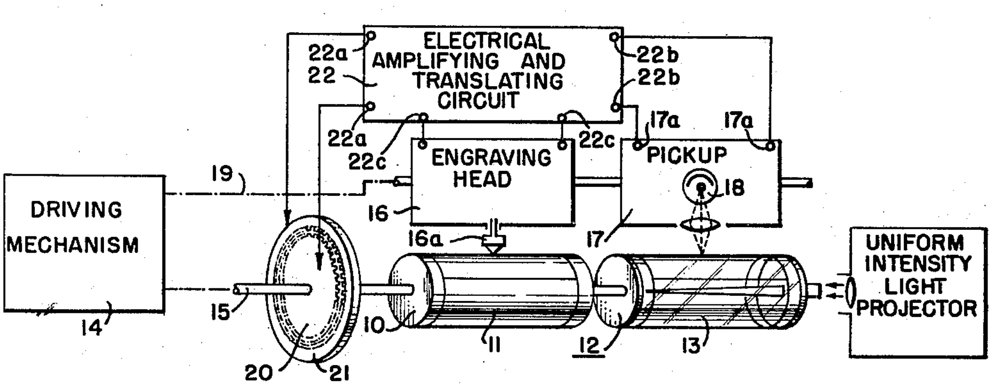
Fig. 1 is a schematic representation of a complete apparatus for producing screened relief pattern plates embodying a transparent image-sheet scanning apparatus of the invention.

Fig. 3 is a perspective view of an optical light-distributing element embodied in the apparatus of Figs. 1 and 2.

Referring now to Fig. 1 of the drawings, there is represented a machine for producing on a record sheet from a transparent image sheet a screened pattern suitable for image reproduction including transparent image-sheet scanning apparatus embodying the invention. The machine comprises a rotatable cylinder 10 for supporting a record sheet 11 which may be in the form of a sheet of cellulose nitrate. The machine also includes a rotatable cylinder 12 for supporting an image sheet 13, the elements 12 and 13 being described in more detail hereinafter. The cylinders 10 and 12 are connected to be rotated synchronously by means of any suitable driving mechanism 14 and shaft 15.

The machine of Fig. 1 also includes a pair of synchronously reciprocable carriages comprising an engraving head 16 and a pick-up unit 17 individually including a recording element or engraving stylus 16*a* for scanning the record sheet 11 on cylinder 10 and an optical pick-up unit 18 for scanning an image sheet 13 on the cylinder 12. The engraving head 16 and pick-up unit 17 are connected by way of a shaft 19 to the driving mechanism 14 so that these units are reciprocated synchronously and in timed relation to the rotation of the cylinders 10 and 12. On the shaft 15 there is also mounted a rotor 20 of a screen-frequency generator having a stator 21, the elements 20 and 21 having oppositely disposed teeth of equal numbers so that, upon rotation, they essentially comprise a capacitor variable in value at a frequency depending upon the number of opposed teeth and the relative speed of rotation of the elements. As described in aforesaid Patent 2,575,546, the stator 21 may be rotated at a suitably low speed to provide a desired angularity in the screen pattern.

The elements 20, 21 are connected to input terminals 22*a*, 22*a* of an electrical amplifying and translating circuit 22, while the output terminals 17*a*, 17*a* of the pick-up unit 17 are connected to other input terminals 22*b*, 22*b* of the unit 22, the unit being effective to modulate the high-frequency screen signal developed by the generator 20, 21 with the video-frequency signal developed by the pick-up unit 17. This modulated signal is then applied from output terminals 22*c*, 22*c* to the engraving head unit 16 for reciprocating the engraving stylus 16*a*. With the exception of the cylinder 12, the image sheet 13, and the pick-up unit 17, the several elements so far described may be constructed in accordance with the disclosure of aforesaid Patent 2,575,546 and, per se, comprise no part of the present invention.

Coming now to the transparent image-sheet scanning apparatus of the invention represented in more detail in Figs. 2 and 2*a*, this apparatus comprises the cylinder 12, which is in the form of a transparent cylinder or tube 23 of glass or plastic disposed to be scanned by the pick-up unit 17 of Fig. 1. The tube 23 is supported at one end by a hub 24 which tightly closes the end of the tube and is secured thereto by suitable means, such as screws 25. The hub 24 has a projecting stub shaft 24*a* journalled in the frame 26 of the machine. The stub shaft 24*a* is connected to be driven synchronously with the record cylinder 10 by the shaft 15 through a suitable coupler 27. A cylindrical bearing member 28 is secured to the other end of the tube 23 by screws 29, or the like, so that the member 28 effectively comprises an extension of the tube 23, but of slightly lesser diameter, so that this end of the tube 23 is effectively open. The bearing member 28 is journalled in a hollow external bearing member 30 secured to the frame 26 as by screws 31.

The image-sheet scanning apparatus of the invention also comprises an elongated tapered transparent rod 32 preferably of a clear plastic, such as methyl methacrylate (commercially available under the trademark "Lucite"). The rod 32 extends into the transparent cylinder 12 and projects from the open end thereof and through the bearing elements 28, 30. The rod 32 has its upper longitudinal face 32*a* parallel and opposed to an element of the transparent tube 23 and has its opposite or lower longitudinal face 32*b* inclined toward the face 32*a* in a direction away from the open end of the cylinder 12. The lower inclined face 32*b* is preferably coated with a reflecting substance, such as an optical white lacquer. As shown more clearly in Fig. 3, the rod 32 has a converging section 32*c* for concentrating the light impressed upon its end, as described hereinafter.

The image-sheet scanning apparatus also includes universal supporting means for aligning the rod 32 with the cylinder assembly. This aligning means is in the form of an annular ring 33 having a flange 33*a* secured to the frame member 26 by the screws 31. There are provided two angularly and longitudinally spaced pairs of opposed adjusting and supporting screws 34, 35 and 36, 37 extending radially through the ring 33 and threaded therein.

There is also provided a light shield 38 closing the end of the ring 33, and thus effectively closing the end of the cylinder 12, and closely surrounding the rod 32. As shown in Fig. 1, the optical system of the pick-up unit 17 is directed toward the upper face 32*a* of the rod 32 within and parallel to the upper element of the tube 23.

The image-sheet scanning apparatus of the invention also includes means for illuminating the end of the rod 32 with substantially uniform intensity over the cross section thereof. This means may be in the form of a high intensity incandescent lamp 39, a parabolic reflector 40, and a collimating lens 41, all mounted within a housing 42 adjustably supported from frame 26.

It is believed that the operation of the machine for producing screened relief pattern plates and the transparent image-sheet scanning apparatus thereof will be apparent from the foregoing description. In brief, the driving mechanism 14 rotates the cylinders 10 and 12 at a suitable speed and simultaneously moves the engraving head 16 and the pick-up unit 17 transversely of the cylinders 10 and 12, respectively. Simultaneously, the screen-frequency generator 20, 21 and its associated amplifier circuit 22 generates a sinusoidal screen-frequency alternating potential. The light from the high-intensity source 39 is projected by the collimating lens 41 into a parallel beam of substantially constant intensity over its cross section and this beam is directed upon the end of the transparent rod 32 and is translated to the interior of the cylinder assembly 12. At the same time, extraneous light is substantially excluded from the interior of the cylinder by the light shield 38.

As is well understood, the transparent rod 32 of methyl methacrylate has an index of refraction of the order of 1.5 so that it is effective to confine the light directed upon its end and transmit it as a substantially parallel beam into the interior of the cylinder. As the parallel beam strikes the inclined reflecting surface 32*b*, it is diffusely reflected upwardly as indicated by the arrows 50, 51, 52. This reflected light obviously passes through the transparent tube 23 and the transparent image sheet 13 mounted thereon in the form of a narrow longitudinal beam.

The optical system of the pick-up unit 17 is focused upon the illumination line of the image sheet 13 and, as the cylinder 12 is rotated and the pick-up unit 17 simultaneously moved transversely, the image sheet 13 is scanned in a close-pitch helix and the illumination of the photoelectric element 18 varies from instant to instant in accordance with the density of the successive elemental areas of the image sheet 13. The pick-up unit 17 thus generates a video signal representative of the variations of density of the image sheet 13 during scanning. This signal is applied to the terminals 22*b*, 22*b* of the amplifying unit 22 wherein it is effective to modulate the screen-frequency signal developed therein and this modulated screen-frequency signal is applied to the engraving head 16 to oscillate the stylus 16*a* and to form deformations in the record sheet or plate 11 of an area varying with variations in density of corresponding elemental areas of the image sheet 13, substantially as described in aforesaid Patent 2,575,546.

By means of the two opposed pairs of supporting and adjusting screws 34, 35 and 36, 37, the position of the rod within the cylinder 12, together with its parallel alignment therewith, may be readily adjusted so that the linear light beam emanating therefrom may precisely coincide with the locus of the focal point of the pick-up unit 17 as it scans the cylinder 12.

It will be noted that the transparent image-sheet scanning apparatus described has a number of distinct advantages. The heat from the high-intensity light source 39, which may be substantial, is generated entirely outside of the cylinder 12 so that it may be readily dissipated and the light source 39 may be readily replaced in its housing 42 without any disassembly of the scanning apparatus, per se. Also, the arrangement is such that the interior of the cylinder 12 is maintained substantially dust-free, thus avoiding periodic disassembly for removal of dust, which seriously impairs the performance of the apparatus. Further in the apparatus described, there is but a single rotary mechanical connection, namely, that between the bearing elements 28 and 30 of the cylinder assembly.

While there has been described what is at present considered to be the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a machine for producing on a record sheet from a transparent image sheet a screened pattern suitable for image reproduction and including a rotatable cylinder for supporting a record sheet and a pair of synchronously reciprocable carriages individually including a recording element for scanning said record-sheet cylinder and an optical pick-up device, apparatus for scanning a transparent image sheet comprising: a transparent image-sheet cylinder rotatable synchronously with said record-sheet cylinder and disposed to be scanned by said pick-up device; a stationary elongated tapered transparent rod extending into said transparent cylinder throughout its length and projecting from one end thereof, said rod having one longitudinal face parallel and opposed to a longitudinal element of said cylinder and having an opposite longitudinal face inclined toward said one face in a direction away from said one end of said cylinder; and means for illuminating the end of said rod projecting from said cylinder with substantially uniform intensity over the cross section thereof.

2. In a machine for producing on a record sheet from a transparent image sheet a screened pattern suitable for image reproduction and including a rotatable cylinder for supporting a record sheet and a pair of synchronously reciprocable carriages individually including a recording element for scanning said record-sheet cylinder and an optical pick-up device, apparatus for scanning a transparent image sheet comprising: a transparent image-sheet cylinder rotatable synchronously with said record-sheet cylinder and disposed to be scanned by said pick-up device; a stationary elongated tapered transparent rod extending into said transparent cylinder throughout its length and projecting from one end thereof, said rod having one longitudinal face parallel and opposed to a longitudinal element of said cylinder and having an opposite longitudinal face inclined toward said one face in a direction away from said one end of said cylinder and having an opaque light-reflecting coating on said inclined face; and means for illuminating the end of said rod projecting from said cylinder with substantially uniform intensity over the cross section thereof.

3. In a machine for producing on a record sheet from a transparent image sheet a screened pattern suitable for image reproduction and including a rotatable cylinder for supporting a record sheet and a pair of synchronously reciprocable carriages individually including a recording element for scanning said record-sheet cylinder and an optical pick-up device, apparatus for scanning a transparent image-sheet comprising: a transparent image-sheet cylinder rotatable synchronously with said record sheet cylinder and disposed to be scanned by said pick-up device; a stationary elongated tapered transparent rod of methyl methacrylate extending into said transparent cylinder throughout its length and projecting from one end thereof, said rod having one longitudinal face parallel and opposed to a longitudinal element of said cylinder and having an opposite longitudinal face inclined toward said one face in a direction away from said one end of said cylinder and having a coating of optical white lacquer on said inclined face; and means for illuminating the end of said rod projecting from said cylinder with substantially uniform intensity over the cross section thereof.

4. An apparatus for scanning a transparent image sheet comprising: a rotatable transparent cylinder for supporting an image sheet and having an open end; a stationary elongated tapered transparent plastic rod extending into said cylinder throughout its length and projecting from said open end thereof, said rod having one longitudinal face parallel and opposed to a longitudinal element of said cylinder and having an opposite longitudinal face inclined toward said one face in a direction away from said one end of said cylinder and having a coating of optical white lacquer on said inclined face; means for illuminating the end of said rod projecting from said cylinder with substantially uniform intensity over the cross section thereof; an optical pick-up device directed toward said parallel face of said rod within said cylinder; and means for rotating said cylinder and simultaneously advancing said pick-up device longitudinally of said cylinder.

References Cited in the file of this patent

UNITED STATES PATENTS

| | | |
|---|---|---|
| 1,925,814 | Nicolson | Sept. 5, 1933 |
| 2,489,691 | Washington | Nov. 29, 1949 |
| 2,639,322 | Young | May 19, 1953 |